C. J. ALGE, J. E. WEBB & W. P. HENSON.
CAR FENDER.
APPLICATION FILED MAY 20, 1913.
1,094,959.
Patented Apr. 28, 1914.
3 SHEETS—SHEET 1.
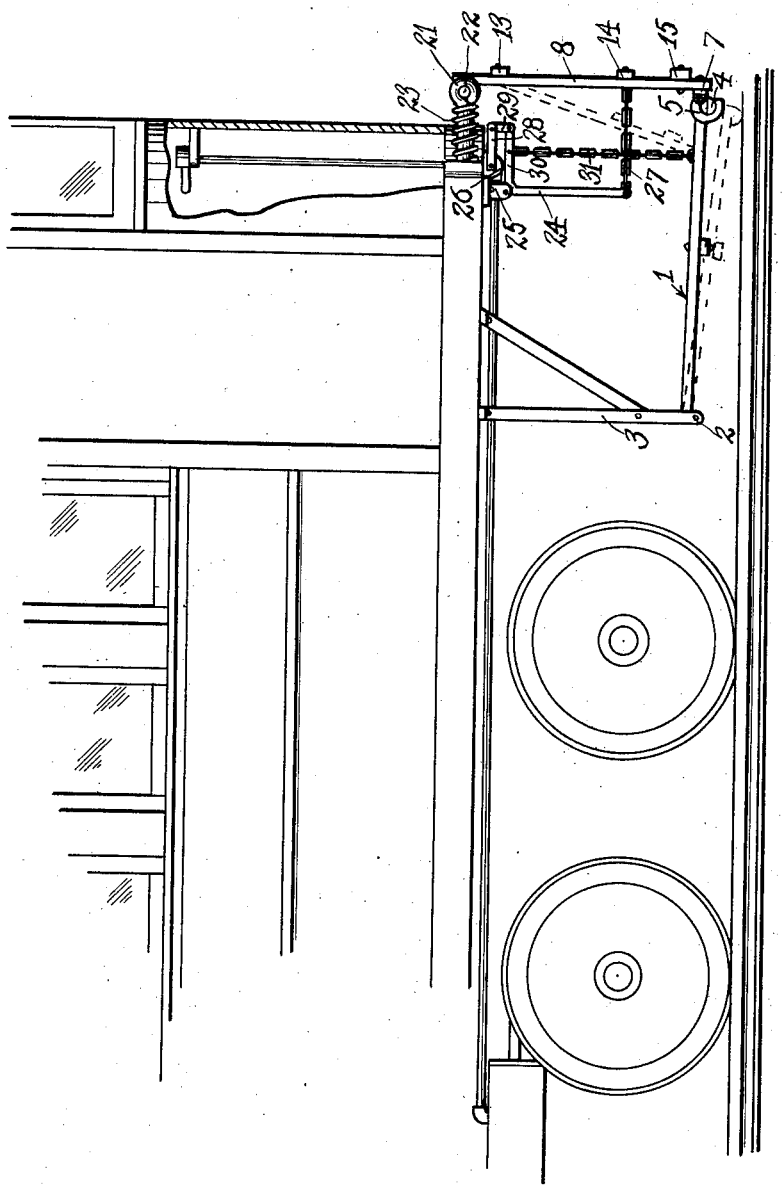
Fig.1
Witnesses
Inventors
C.J.Alge, W.P.Henson,
J.E. Webb.
By 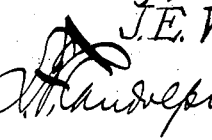
Attorney C. J. ALGE, J. E. WEBB & W. P. HENSON.
CAR FENDER.
APPLICATION FILED MAY 20, 1913.

1,094,959.

Patented Apr. 28, 1914.

3 SHEETS—SHEET 3.

Witnesses
M. G. Wadhams
C. H. Landon

Inventor
C.J.Alge, W.P.Henson
J.E.Webb.
By
Attorney

UNITED STATES PATENT OFFICE.

CLARENCE J. ALGE, JAMES E. WEBB, AND WILLIAM P. HENSON, OF CHATTANOOGA, TENNESSEE.

CAR-FENDER.

1,094,959.             Specification of Letters Patent.       Patented Apr. 28, 1914.

Application filed May 20, 1913. Serial No. 768,834.

*To all whom it may concern:*

Be it known that we, CLARENCE J. ALGE, JAMES E. WEBB, and WILLIAM P. HENSON, citizens of the United States, residing at Chattanooga, in the county of Hamilton and State of Tennessee, have invented certain new and useful Improvements in Car-Fenders; and we do hereby declare the following to be a full, clear, and exact description of the invention, such as will enable others skilled in the art to which it appertains to make and use the same.

This invention relates to drop fenders, and as its principal object contemplates the provision of a trip gate designed to be employed in connection with the drop fender, which will act to effect the application of the air brakes of a car when a foreign object strikes the fender.

The above and additional objects are accomplished by such means as are illustrated in the accompanying drawings, described in the following specification and then more particularly pointed out in the claims which are appended hereto and form a part of this application.

Figure 2:
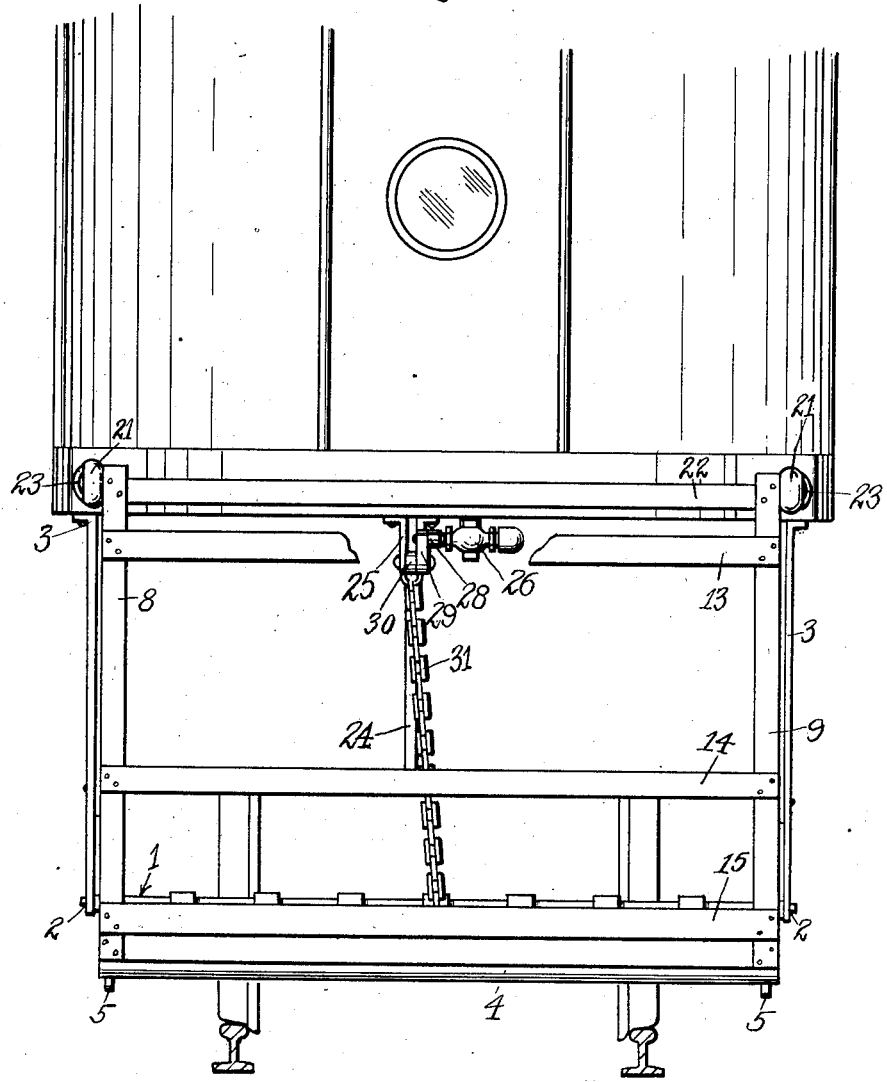
Figure 3:
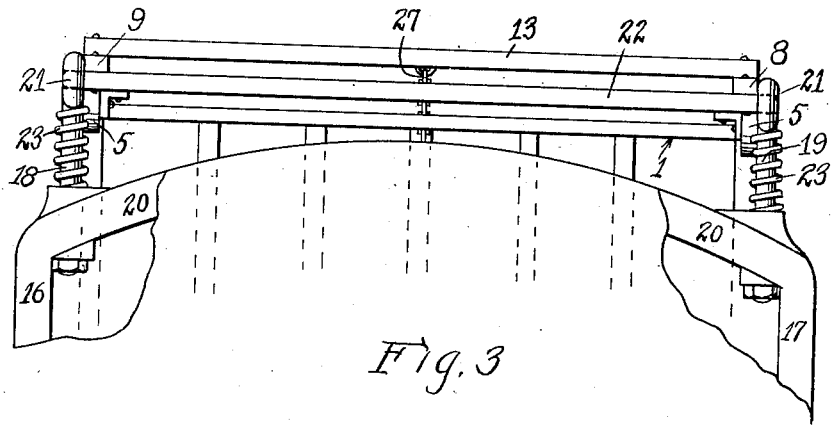
Figure 4:
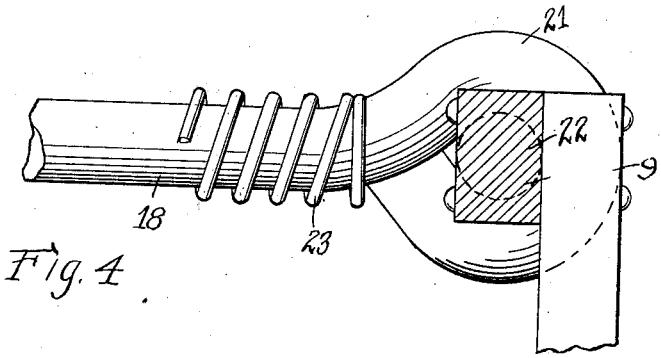
Figure 5:
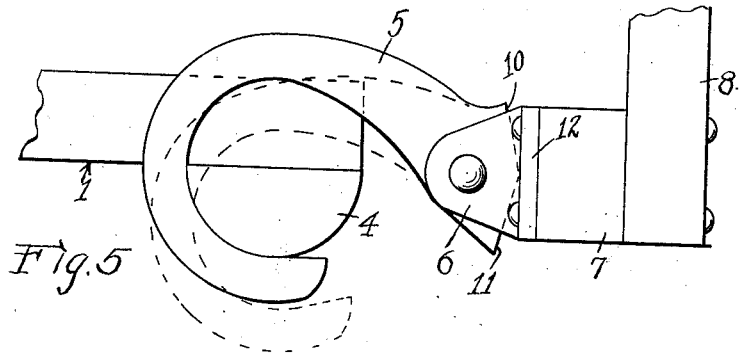

With reference to the drawings, wherein we have illustrated the preferred embodiment of our invention as it is reduced to practice, and throughout the several views of which similar reference numerals designate corresponding parts, Figure 1 is a side elevation of our improved fender attached to the front of a car; Fig. 2 is a front elevation of our improved fender attached to the front of a car; Fig. 3 is a top plan view of the forward part of the car, illustrating the trip gate secured to the forward end of the car; Fig. 4 is a detail view illustrating the means employed in attaching the trip gate to the supporting rods; Fig. 5 is a detail view illustrating the means employed in holding the fender in a raised position.

Proceeding now to the description of the drawings, the numeral 1 designates the drop fender of this invention, which may be of any suitable and usual construction, and is pivotally connected, as at 2, to the dependent supporting bracket 3. The forward and free terminal of the member 1 carries a cross rod 4, the ends of which extend beyond the side members of the fender and are arranged for engagement with hooks 5 pivotally attached to ears 6 which are bolted or otherwise secured to a cross bar 7 carried at the lower terminals of the side frame members 8 and 9 of the fender gate to be hereinafter described. The hooks 5 are shaped at their pivot terminal to produce the oppositely inclined shoulders 10 and 11, which by engagement with the space plate 12 of the member 6 operate to limit the swinging movement of the hook.

The trip gate includes the side members 8 and 9 above mentioned, and the cross beams 13, 14 and 15. As a means for swinging the trip gate from the longitudinal beams 16 and 17 of the car, this invention comprises a pair of buffer rods 18 and 19, mounted for sliding movement in suitable bores provided in the cross beam 20, and bent at their outer terminals to produce the eyes 21, in which are mounted the terminal portions of a cross beam 22 secured to the members 8 and 9. Mounted in circular engagement around each of the members 18 and 19 is a spiral expansion spring 23 adapted to normally hold the members 18 and 19 in outermost position, but being also adapted to permit the rods to move inwardly when the trip gate is struck by any foreign object. The construction of the trip gate and fender being thus disclosed, it now remains to describe the mechanism employed in effecting an automatic application of the brakes when the trip gate is struck by a foreign object. This feature of the invention includes a bell crank lever 24, pivotally mounted between suitable dependent ears 25, and arranged with its pivotal point rearward of the air valve 26 of the brake system. The lower terminal of the lever 24 is connected to the cross beam 14 by a chain 27. The valve stem of the valve 26 is provided with a laterally extending lever arm 28 pivotally connected at its free terminal to arm 30 of the lever 24 by a link 29. The laterally extending arm 30 of the lever 24 is connected to the fender 1 by a chain 31, for a purpose to be hereinafter described.

When the mechanism above described is in assembled position, the member 4 of the fender 1 rests in the hook members 5, thus holding the fender in spaced relation from the ground. It will, therefore, be apparent that any force moving against the trip gate will swing the gate rearwardly, releasing the member 4 from the hooks 5 and permitting the fender to drop into the position indicated by dotted lines in Fig. 1. As the fender 1 drops into this position, it will, by reason of its own weight and by reason of the weight of the striking object, exert a pull upon the arm 30. This pull will be transmitted to the arm 28 by the link 29. Upon the downward movement of the arm 28, the valve 26 will be opened and the air brakes applied in the usual manner. It is desirable to emphasize this point and the extreme simplicity and efficiency of this device, which automatically releases the drop fender and applies the brake when the trip gate strikes any object which may be in the path of the moving car.

In reduction to practice, we have found that the form of our invention illustrated in the drawings and referred to in the above description as the preferred embodiment is the most efficient and practical; yet, realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claims.

What is claimed is:

1. The combination with a tram car having an air brake system, of a drop fender, brackets depending from the frame of said car for pivotally supporting the said drop fender, a trip gate swingingly mounted forwardly of the pivotal point of said fender, a lever arm attached to the valve stem of the air brake valve, a bell crank lever pivotally secured to the frame of said car, a link connecting the lateral arm of said bell crank lever to the said lever arm, a chain connecting said lateral arm to the said drop fender, and a chain connecting the vertical arm of said bell crank lever to the said trip gate, the said fender being adapted to open the said air valve when released by the said trip gate.

2. The combination with a tram car having an air brake system, of a drop fender, a trip gate carried forwardly of the pivotal point of the fender and adapted to normally hold the said fender in spaced relation from the ground, a pair of spring pressed buffer rods slidably mounted in the frame work of said car, a cross beam connecting the said buffer rods, a pair of hook members carried by said trip gate and mounted for swinging movement thereon, means operatively connecting the said fender to the control valve of the said air brake system, said means being adapted to apply the brakes when the said fender is released by said trip gate.

3. The combination with a tram car having an air brake system, of a drop fender, a trip gate carried forwardly of the pivotal point of the fender and adapted to normally hold said fender in spaced relation from the ground, a pair of spring pressed buffer rods slidably mounted in the frame work of said car, a cross beam secured to said trip gate and connecting the said buffer rods, means for securing the drop fender to said trip gate and holding said drop fender in raised position, and means operatively connecting said fender to the control valve of the said air brake system.

In testimony whereof we affix our signatures in presence of two witnesses.

CLARENCE J. ALGE.
JAMES E. WEBB.
WILLIAM P. HENSON.

Witnesses:
J. W. RUMMITT,
T. W. MORRIS.

Copies of this patent may be obtained for five cents each, by addressing the "Commissioner of Patents, Washington, D. C."